(12) United States Patent
Steinkopf et al.

(10) Patent No.: US 11,372,254 B2
(45) Date of Patent: Jun. 28, 2022

(54) ARRANGEMENT FOR PRODUCING A BESSEL BEAM

(71) Applicants: Fraunhofer-Gesellschaft zur Förderung der angewandten Forschung e.V., Munich (DE); Friedrich-Schiller-Universität Jena, Jena (DE)

(72) Inventors: Ralf Steinkopf, Jena (DE); Stefan Nolte, Jena (DE); Christian Vetter, Besancon (FR); Alexander Szameit, Bad Doberan (DE); Herbert Gross, Kleinpurschutz (DE); Marco Ornigotti, Tampere (FI)

(73) Assignee: Fraunhofer-Gesellschaft zur Forderung der Angewandten Forchung E.V., Munich (DE)

( * ) Notice: Subject to any disclaimer, the term of this patent is extended or adjusted under 35 U.S.C. 154(b) by 230 days.

(21) Appl. No.: 16/313,667

(22) PCT Filed: Jun. 22, 2017

(86) PCT No.: PCT/EP2017/065343
§ 371 (c)(1),
(2) Date: Dec. 27, 2018

(87) PCT Pub. No.: WO2018/001846
PCT Pub. Date: Jan. 4, 2018

(65) Prior Publication Data
US 2020/0333611 A1     Oct. 22, 2020

(30) Foreign Application Priority Data

Jul. 1, 2016 (DE) .......................... 102016112137.1
Aug. 25, 2016 (DE) .......................... 102016115844.5

(51) Int. Cl.
G02B 27/09       (2006.01)
G02B 5/00        (2006.01)

(52) U.S. Cl.
CPC ......... G02B 27/0927 (2013.01); G02B 5/001 (2013.01); G02B 27/0905 (2013.01); G02B 27/0961 (2013.01)

(58) Field of Classification Search
CPC ............ G02B 27/0927; G02B 27/0905; G02B 27/0961; G02B 27/09; G02B 5/001; H01S 3/005; H01S 3/0085; H01S 3/00
(Continued)

(56) References Cited

U.S. PATENT DOCUMENTS 6,389,192 B1 *   5/2002  Fujita ................... G02B 6/2937
                                                            385/24
2002/0027661 A1 *  3/2002  Arieli ........................ G01J 9/00
                                                            356/512
(Continued)

FOREIGN PATENT DOCUMENTS

CN     102109680 A   *  6/2011
CN     104880828    *  6/2015 ............. G02B 27/09
(Continued)

OTHER PUBLICATIONS

International Search Report of the International Searching Authority with English translation issued in the corresponding PCT International Application No. PCT/EP2017/065343, dated Oct. 19, 2017 (7 pages).
(Continued)

*Primary Examiner* — Travis S Fissel
(74) *Attorney, Agent, or Firm* — Raymond R. Ferrera; Adams and Reese LLP

(57) ABSTRACT

The invention relates to an arrangement for producing a Bessel beam (5), comprising a beam-forming element (2), which transforms a beam (1) incident as a plane electromagnetic wave into a Bessel beam (5). According to the invention, the beam-forming element (2) comprises at least
(Continued)

Figure 1:
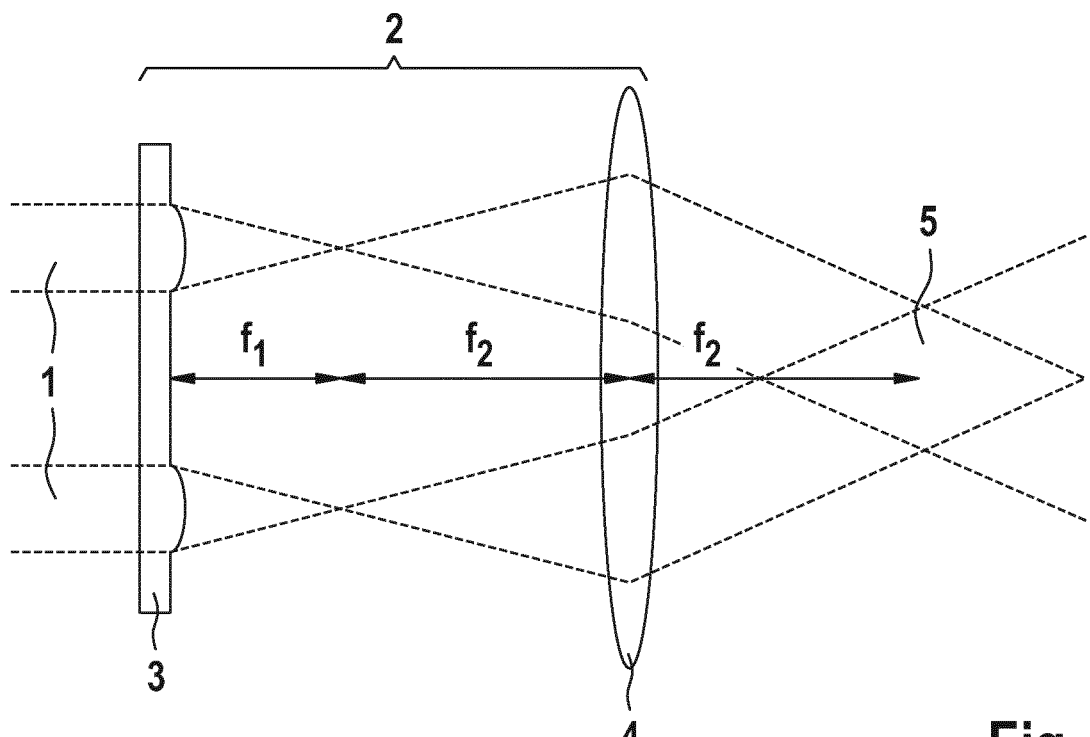

one annular lens (3, 3') and a Fourier optical unit, e.g. in the form of a Fourier lens (4).

10 Claims, 3 Drawing Sheets

(58) Field of Classification Search
USPC .................................................. 359/741–743
See application file for complete search history.

(56) References Cited

U.S. PATENT DOCUMENTS

| | | | | |
|---|---|---|---|---|
| 2013/0294468 A1* | 11/2013 | Sridharan | ........... | H01S 3/10053 372/29.02 |
| 2016/0377874 A1* | 12/2016 | Zhou | ....................... | G02B 7/005 359/569 |
| 2018/0246308 A1* | 8/2018 | Shi | ..................... | G02B 21/0072 |

FOREIGN PATENT DOCUMENTS

| | | | |
|---|---|---|---|
| CN | 104880828 A | 9/2015 | |
| CN | 105182523 A | 12/2015 | |
| DE | 10044522 A1 * | 4/2002 | ............. G02B 27/09 |
| DE | 10044522 A1 | 4/2002 | |
| DE | 102004011190 A1 | 9/2005 | |
| DE | 102007063274 A1 | 6/2009 | |

OTHER PUBLICATIONS

Written Opinion of the International Search Authority (Form PCT/ISA/237) with English translation issued in the corresponding PCT International Application No. PCT/EP2017/065343, dated Oct. 19, 2017 (12 pages).

International Preliminary Report on Patentability Chapter I issued in the corresponding PCT International Application PCT/EP2017/065343, dated Oct. 19, 2017 (7 pages).

* cited by examiner

ARRANGEMENT FOR PRODUCING A BESSEL BEAM

The invention relates to an arrangement for producing a Bessel beam, comprising a beam-forming element, which transforms a beam incident as a plane electromagnetic wave into a Bessel beam.

A Bessel beam is understood as a special form of electromagnetic waves, in particular light beams, whose essential property is that they are non-diffractive, and that the beam profile is maintained during propagation.

Frequently, the term "Bessel-Gaussian beam" is utilized for a really generated Bessel beam, because an ideal Bessel beam cannot be created for physical reasons. This distinction is dispensed with in the following. The present invention relates to Bessel beams generated under real conditions, i.e. non-ideal Bessel beams.

For generating a Bessel beam, it is known from prior art to utilize a beam-forming element which transforms a beam incident as a plane electromagnetic wave into a Bessel beam. Since a Bessel beam constitutes a conical superposition of plane waves, mainly conical lenses, so-called axicons, are utilized as beam-forming elements in prior art (vide J. Arlt and K. Dholakia: "Generation of high-order Bessel beams by use of an axicon", Optics Communications 177.1-6, 2000, S. 297-301). Their efficiency is high, but they are quite inflexible when it matters to combine several beams with each other. Moreover, due to the central peak, axicons are difficult to manufacture in good quality, hence they are correspondingly expensive and moreover susceptible to damage.

If more sophisticated variants of Bessel beams are to be generated, e.g. high-order Bessel beams, spatial light modulators (SLMs) are often utilized in prior art. These are configured in the kind of liquid crystal displays which enable a spatial variable phase and/or amplitude modulation of the incident plane electromagnetic waves. SLMs are controlled by means of computers. They can be applied with extreme flexibility. However, the use of SLMs is complex and expensive. Another drawback lies in that SLMs have a low damage threshold and involve high losses in beam transformation.

Against this background, it is the object of the present invention to provide an arrangement for generating a Bessel beam that is improved over prior art in technology. The afore-mentioned drawbacks of the conventional production of Bessel beams are to be avoided.

The present invention solves this task based on an arrangement specified hereinabove in that the beam-forming element comprises at least one annular lens and one Fourier optical unit.

The inventive production of a Bessel beam is based on the Fourier principle. A Bessel beam, as has already been stated hereinabove, is a conical superposition of plane waves. Accordingly, the spatial angle spectrum of the Bessel beam is given by a sharp, circular ring. The Bessel beam results from a spatial Fourier transformation of such a ring.

According to the present invention, an annular lens is utilized for generating a ring-shaped radiation. The annular lens comprises a ring-shaped, curved surface which, when viewed in its cross-section, corresponds to a cylindrical lens which is closed in itself, e.g. closed to a circle. In its focal plane, the annular lens produces a sharp ring-shaped beam profile. This is spatially Fourier-transformed by means of the Fourier optical unit arranged downstream in the beam trajectory of the annular lens. The result is the desired Bessel beam. The inventive annular lens can be but need not necessarily be circular. Deviating ring shapes, for example elliptical shapes, are also conceivable in order to generate corresponding variants of Bessel beams.

The Fourier transformation can advantageously be effected by means of a Fourier lens, i.e. an arbitrary converging lens which arranged downstream of the annular lens is implemented as Fourier optical unit. Likewise, the Fourier transformation can be effected by means of a simple far-field propagation, i.e. without special optical components.

When applying a Fourier lens as Fourier optical unit according to the present invention, the focal planes of the annular lens and of the Fourier lens should coincide so that the annular lens and the Fourier lens form a Kepler configuration or a Galilei configuration. The Bessel beam can be produced accordingly either with or without an intermediate focus.

For superposition of several Bessel beams, the beam-forming element of the inventive arrangement may comprise two or more concentric annular lenses. Their focal planes should preferably coincide. In their common focal plane, the concentric annular lenses produce a beam profile with rings of different diameters which by means of the Fourier optical unit are transformed into accordingly superimposed Bessel beams.

Higher-order Bessel beams are characterized in that in addition to their ring-shaped spatial angle spectrum they comprise a helical phase term of the order of N, where N stands for the phase deviation after a full revolution in peripheral direction in multiples of $2\pi$. To produce a higher-order Bessel beam, a phase manipulating element impressing a phase shift, in particular a helical phase shift, on the beam, varying over the beam cross-section, can be accordingly arranged in the beam path of the inventive arrangement. In practice, this can be realized e.g. by way of a phase plate consisting of a material having a refractive index deviating from the environment and comprising a thickness varying relative to the beam axis in radial direction and in peripheral direction in order to thus obtain the desired helical phase shift.

The beam-forming element of the inventive arrangement can be realized with advantage in an especially compact form by configuring the annular lens in one piece with the Fourier lens. To this effect, the beam-forming element may comprise a concave annular lens on the surface facing the incident plane wave. The opposite surface is curved and thus forms the Fourier lens. The coinciding focal planes of the annular lens and of the Fourier lens lie in a common plane (Galilei configuration) on the beam-forming element side facing the incident plane wave.

Preferably, the beam-forming element of the inventive arrangement comprises a ring-shaped aperture that corresponds with the annular lens. Thereby, only the ring-shaped radiation in the focus of the annular lens is transformed by the Fourier optical unit. Interfering parts of the radiation are faded out.

To optimize efficiency during transformation of the plane wave into the Bessel beam, the inventive arrangement may comprise a beam pre-forming element located in the beam path trajectory upstream of the beam-forming element, said pre-forming element transforming the light beam incident as a plane wave into a beam with a ring-shaped cross-section. The beam pre-forming element takes the effect that the incident beam is completely transformed into the Bessel beam. The beam pre-forming is realized corresponding to the geometry of the annular lens. For example, the beam pre-forming element may comprise a concave axicon and a convex axicon located downstream thereof in the beam path.

Figure 2:
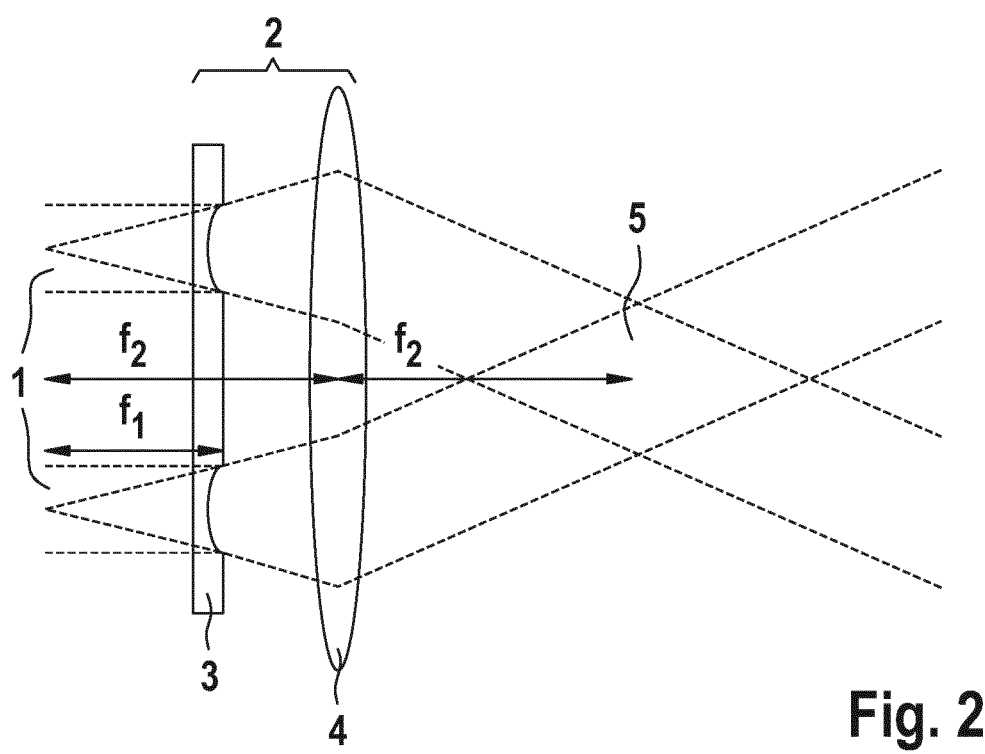
Figure 3:
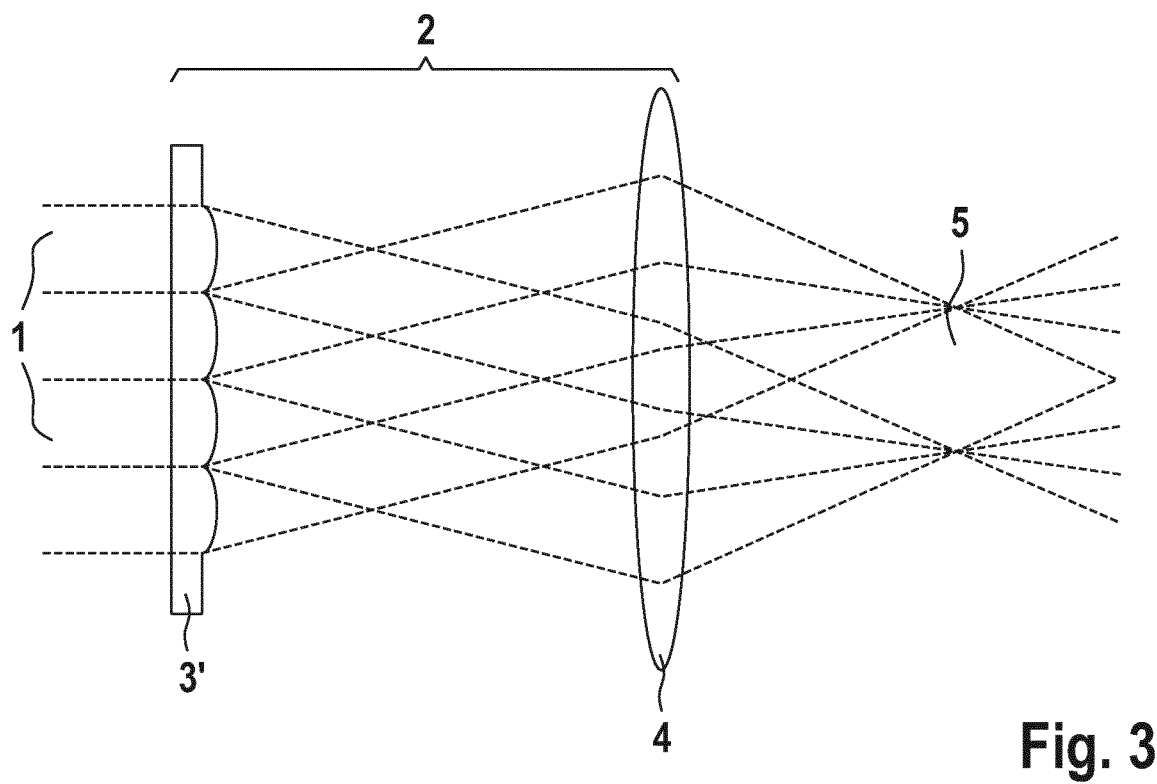
Figure 4:
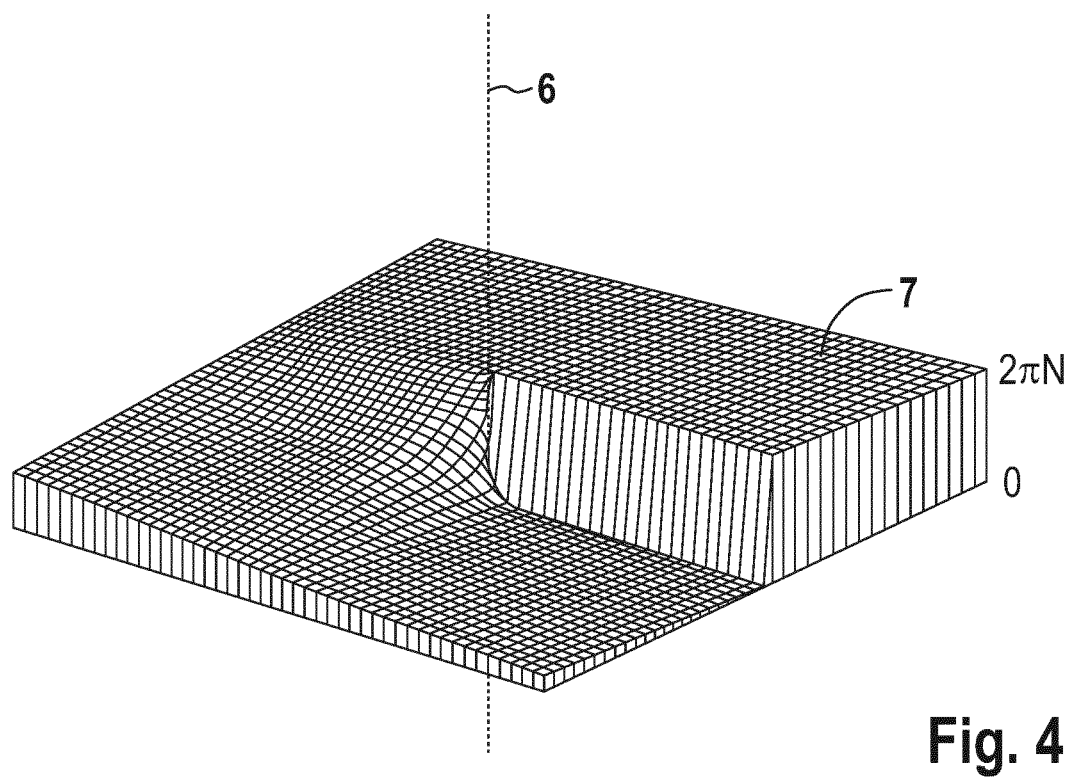
Figure 5:
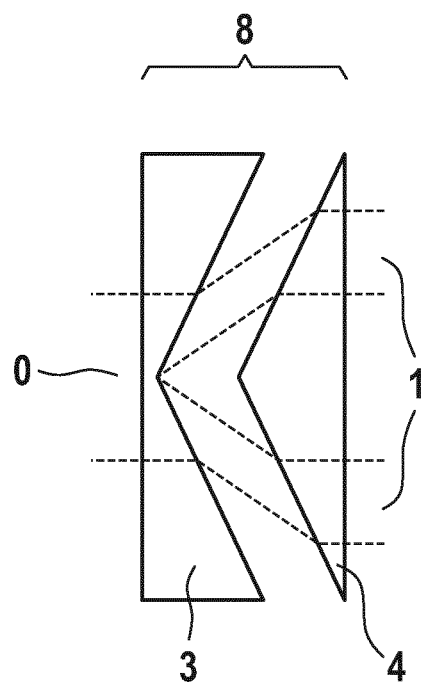
Figure 6:
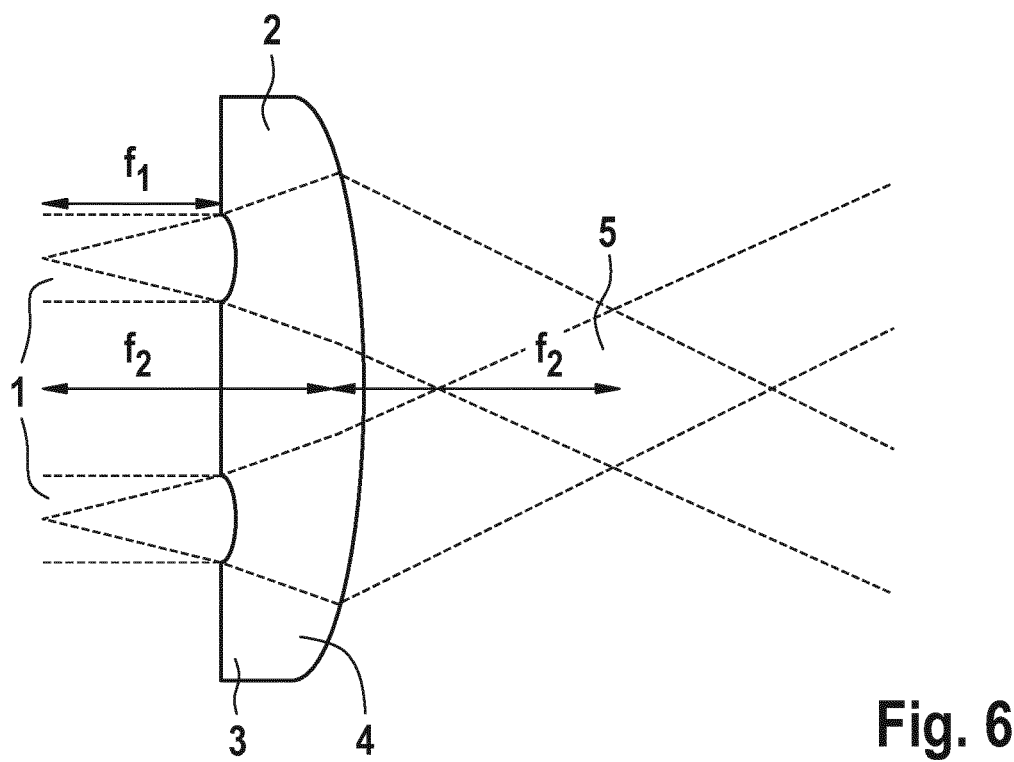

Examples for carrying-out the invention are explained in more detail in the following on the basis of drawings, where:

FIG. 1: shows the inventive arrangement in a first embodiment;

FIG. 2: shows the inventive arrangement in a second embodiment;

FIG. 3: shows a beam-forming element with several concentric annular lenses;

FIG. 4: shows a phase plate for producing a higher-order Bessel beam;

FIG. 5: shows a beam pre-forming element of the inventive arrangement;

FIG. 6: shows the inventive arrangement in a third embodiment with a monobloc one-piece beam-forming element.

With the arrangement illustrated in FIG. 1, a light beam 1 is incident from the left. The electromagnetic radiation passes through a beam-forming element 2 which is formed by a convex annular lens 3 and a Fourier lens 4. By way of the beam-forming element 2, the incident beam 1 is transformed into a Bessel beam 5 which leaves the arrangement in FIG. 1 towards the right. It is a Bessel beam of the order of O. The focal widths $f_1$ and $f_2$ of the annular lens 3 and/or Fourier lens 4 are described in FIG. 1. It can be seen that the focal planes of the annular lens 3 and Fourier lens 4 coincide. Thus the annular lens 3 and the Fourier lens 4 form a Kepler configuration, similar to a Kepler telescope. The annular lens 3 produces a sharp ring-shaped beam cross-section in the focal plane between annular lens 3 and Fourier lens 4. Hence, the illustrated arrangement comprises an intermediate focus.

In the practical example of FIG. 2, a concave annular lens 3 is applied. The arrangement does not comprise an intermediate focus. The focal planes coincide on the side of the annular lens 3 facing the incident beam 1. The annular lens 3 and the Fourier lens 4 form a Galilei configuration, similar to a Galilei telescope. The avoidance of the intermediate focus is of advantage in high-performance applications. Moreover, it results in a much more compact design. The drawback lies in that it is impossible to intervene into the focal plane, i.e. into the Fourier plane of the arrangement (e.g. by way of apertures). Also with the arrangement illustrated in FIG. 2, a Bessel beam of the order of 0 is produced.

If it is required to superimpose several Bessel beams, then a beam-forming element 2 as shown in FIG. 3 can be applied which comprises two (or more) concentric annular lenses whose focal planes coincide. With the practical example shown in FIG. 3, two annular lenses are integrated in one piece with each other in a lens element 3'. The beam-forming element 2 produces a correspondingly superimposed beam 5'. In FIG. 3, the lens element 3' and the Fourier lens 4 again form a Kepler configuration.

In the illustrated practical examples, the beam-forming element 2 comprises a ring-shaped aperture in order to fade-out those portions of the incident beam 1 that are non-desired for producing the Bessel beam. For example, the annular lenses 3, 3' in the practical examples of FIGS. 1, 2 and 3 in the plane areas, i.e. outside the convex and/or concave-shaped annular areas can comprise a reflective or absorptive coating. Likewise, the non-desired portions of the radiation can be removed in the relevant focal plane, e.g. by means of an appropriate aperture arrangement.

Bessel beams of a higher order are characterized in that in addition to their ring-shaped spatial angle spectrum they comprise a helical phase term of the order of N. This can be produced by means of a phase manipulating element arranged in the beam path and impressing a phase shift on the beam that varies accordingly over the beam cross-section. A phase manipulating element in form of a phase plate by which a helical phase shift is impressed on the beam is illustrated in FIG. 4. Relative to the beam axis 6 in radial direction and/or peripheral direction, the phase plate 7, which for example is made of quartz glass, comprises a varying thickness. For example, to produce the helical phase term, the thickness grows proportionally to the angle in peripheral direction. To superimpose several Bessel beams of different orders, a phase plate can be used which comprises several concentric "ramps", i.e. several concentric ring-shaped sections with different thickness varying proportionally to the angle in peripheral direction. Alternatively suitable as phase manipulating element is a spatial light modulator (SLM) which is appropriately controlled. The phase manipulating element can be arranged at an arbitrary position in the beam path, in the illustrated practical examples either upstream or downstream of the Fourier lens 4. Preferably, the phase manipulating element is arranged in the focal plane.

In the practical examples of FIGS. 1 and 2, a pre-forming of the radiation 1 incident as a plane electromagnetic wave is realized. The radiation incident on the annular lens 3 already has a ring-shaped cross-section. This beam pre-forming can be effected by means of a beam pre-forming element 8 as illustrated in FIG. 5. Reference number 0 is designated to the beam incident from the left, e.g. having a Gaussian beam profile. It passes through a concave axicon 9 and at a certain distance further downstream in the beam path through a convex axicon 10. The result is the ring-shaped light beam 1 which hits onto the annular lens 3 of the beam-forming element 2 as shown in FIGS. 1 and 2. The diameter of the ring-shaped beam can be adjusted by the distance of axicons 9, 10. By way of the beam pre-forming element 8, it is possible to increase efficiency in producing the Bessel beam 5.

In the practical example illustrated in FIG. 6, the beam-forming element 2 comprises only a single monolithic element by configuring the concave annular lens 3 and the Fourier lens 4 as a one-piece monobloc unit. Similarly to the practical example shown in FIG. 2, the focal planes of the Fourier lens 4 and annular lens 3 coincide on the side of the beam forming element 2 that faces the incident beam 1. It is a Galilei configuration. In a corresponding manner, a monolithic beam-forming element 2 can also be realized in a Kepler configuration, in which the focal plane will then lie in the interior. Such a configuration would be accordingly larger in volume.

The lens surfaces of the annular lenses 3, 3' shown in these Figures can be spherical or aspherical. In the simplest case, spherical surfaces are used.

The inventive principle for producing a Bessel beam can be applied in the optical spectral range, e.g. for laser systems. However, the principle can also be applied in other wavelength ranges, e.g. in the range of microwaves or radio waves.

The advantages of the inventive arrangement are the following ones: superpositions of Bessel beams can be produced simply and directly. They require no complex and thus loss-afflicted setups. Optical components applied (annular lens, Fourier lens) do not have any protruding or sharp-edged structures and thus they are less susceptible to mechanical damage. The inventive arrangement features low losses and a high damage threshold, rendering it suitable for high-performance applications. With the inventive arrangement, it is not the annular lens but the subsequent Fourier optical unit that defines the maximal aperture diameter. Therefore, the most complex component of the arrangement (the annular lens) is not necessarily at the same time the greatest component.

The inventive arrangement can be applied, for example, in the field of material treatment. Bessel beams feature a more extended focus than conventional beam shapes and they show self-healing properties in the direction of propagation. This makes Bessel beams interesting for various types of material treatment such as cutting, drilling, welding as well as lithography and medical applications. Likewise, the extended focus of Bessel beams can be applied in the field of microscopy in order to realize a greater depth of field, to image deeper tissue layers in medical applications as well as to accelerate raster scans. Bessel beams can be utilized with advantage for so-called optical tweezers. By way of Bessel beams and their superpositions, microscopic particles or single biological cells can be transported, aligned or rotated. Furthermore, Bessel beams are advantageously applicable in the field of measurement technology. Optical remote sensing measurement methodologies require good beam quality despite interfering external influences. The self-healing properties of Bessel beams along the direction of propagation are therefore advantageous for atmospheric applications, interferometry and in-depth spectroscopy.

The invention claimed is:

1. An arrangement for producing a Bessel beam, comprising a beam-forming element, which transforms a beam incident as a plane electromagnetic wave into a Bessel beam,
   wherein the beam-forming element comprises at least one annular lens;
   a Fourier optical unit; and
   a ring-shaped aperture that corresponds with the annular lens such that only ring-shaped radiation in the focus of the annular lens is transformed by the Fourier optical unit,
   wherein the ring-shaped aperture is formed by a reflective or absorbent coating outside at least one convexly or concavely shaped annular region of the annular lens.

2. The arrangement according to claim 1, wherein the Fourier optical unit is a Fourier lens.

3. The arrangement according to claim 2, wherein the focal planes of the annular lens and of the Fourier lens coincide so that the annular lens and the Fourier lens form a Kepler configuration or a Galilei configuration.

4. The arrangement according to claim 2, wherein the annular lens is configured in one piece with the Fourier lens so as to form a single, monolithic element.

5. The arrangement according to claim 1, wherein the beam-forming element comprises two or more concentric annular lenses.

6. The arrangement according to claim 1, further comprising a phase manipulating element arranged in the beam path which impresses a phase shift on the beam, said phase shift varying over the beam cross-section.

7. The arrangement according to claim 6, wherein the phase manipulating element impresses a helical phase shift on the beam.

8. The arrangement according to claim 6, wherein the phase manipulating element is a phase plate with a varying thickness in radial direction and/or peripheral direction relative to the beam axis.

9. The arrangement according to claim 1, further comprising a beam pre-forming element arranged in the beam path upstream of the beam-forming element, said pre-forming element transforming the incident beam into a beam with a ring-shaped cross-section.

10. The arrangement according to claim 9, wherein the beam pre-forming element comprises a concave axicon and a convex axicon arranged in the beam path downstream thereof.

* * * * *